TELEVISION SYNCHRONIZING GENERATOR

Filed March 3, 1959 10 Sheets-Sheet 1

INVENTOR.
LAURANCE M. LEEDS,
BY Joseph P. Kates
HIS ATTORNEY.

TELEVISION SYNCHRONIZING GENERATOR

Filed March 3, 1959

INVENTOR:
LAURANCE M. LEEDS,
BY Joseph P. Kates
HIS ATTORNEY.

TELEVISION SYNCHRONIZING GENERATOR

Filed March 3, 1959 10 Sheets-Sheet 3

INVENTOR:
LAURANCE M. LEEDS,

BY Joseph P. Kates

HIS ATTORNEY.

TELEVISION SYNCHRONIZING GENERATOR

Filed March 3, 1959

INVENTOR:
LAURANCE M. LEEDS,
BY Joseph P. Kates
HIS ATTORNEY.

Oct. 25, 1966 L. M. LEEDS 3,281,532

TELEVISION SYNCHRONIZING GENERATOR

Filed March 3, 1959 10 Sheets-Sheet 5

INVENTOR:
LAURANCE M. LEEDS,

BY Joseph P. Kates

HIS ATTORNEY.

INVENTOR:
LAURANCE M. LEEDS,
BY Joseph P. Kates
HIS ATTORNEY.

INVENTOR:
LAURANCE M. LEEDS,
BY Joseph P. Kates
HIS ATTORNEY.

INVENTOR:
LAURANCE M. LEEDS,
BY Joseph P. Kates
HIS ATTORNEY.

INVENTOR:
LAURANCE M. LEEDS,
BY Joseph P. Kates
HIS ATTORNEY.

INVENTOR
LAURANCE M. LEEDS,
BY Joseph P. Kates
HIS ATTORNEY.

United States Patent Office 3,281,532

Patented Oct. 25, 1966

3,281,532

TELEVISION SYNCHRONIZING GENERATOR

Laurance M. Leeds, Syracuse, N.Y., assignor to General Electric Company, a corporation of New York Filed Mar. 3, 1959, Ser. No. 796,825
26 Claims. (Cl. 178—69.5)

The present invention relates to a synchronizing generator conventionally abbreviated "sync" generator and more particularly relates to a synchronizing generator for television stations which is adapted to incorporate transistors for most stages, which utilizes the advantages of computer circuitry and which may be about one half the size and require less than one half the power required for prior art synchronizing generators.

A television sync generator is the basic clock of any television system. All signal generation either utilizes the output signals of the synchronizing generator or is referenced to them. Inasmuch as a sync generator is the heart of the television system, its reliability is paramount, the widths of all pulse outputs must be kept constant and permanently fixed, and periodic adjustment and servicing must be relatively unnecessary.

Television synchronizing signals as generated in a synchronizing generator, comprise four output waveforms. Such waveforms may be designated as the waveforms required for the two respective fields of synchronizing which may be interlaced, the waveforms for the corresponding two respective fields of blanking, vertical drive waveforms required and a horizontal drive waveform which may be a repetitive pulse continuing through the vertical interval. Elaborate limits and very close tolerances are required for such waveforms and the time scale of such waveforms should be in close correspondence with the initiating clock pulse and very closely regulated with respect to a zero reference of time which, for example, can be selected arbitrarily to coincide with the leading edge of syn (the synchronizing waveform). Fundamentally, the generation of television synchronizing is essentially a series of switching operations.

Prior art synchronizing apparatus includes such devices as the television synchronizing generator of A. J. Baracet, Patent No. 2,794,069, issued May 28, 1957; the color television synchronizing apparatus of R. J. Stale et al., Patent No. 2,748,188, issued May 19, 1956; multiplexing system synchronization of W. H. Bliss, Patent No. 2,683,-768, issued July 13, 1954; and the synchronizing generator of Albert E. Wolfe, Jr., Patent No. 2,644,887, issued July 7, 1953. For a textbook discussion of the prior art reference is made to Fundamentals of Television Engineering, Glenn M. Glassford, McGraw-Hill Book Company, Inc., 1955, Chapters 12, 13, 14. Prior art devices have disadvantages in that reliability is not sufficient, there is not generated sufficiently constant width of all pulses, frequent adjustment is necessary, there are problems concerned with the time occurrence of pulses, and prior art equipments are costly, cumbersome and because of the size take up too much space. Because of the lack of proper synchronization of prior art sync generators, flip-flop, jagged and unclear pictures and failure to achieve perfect vertical and horizontal alignment required for a complete picture frequently occurs in their use. The apparatus of the present invention overcomes these and many other disadvantages of the prior art and in addition provides maintenance of a high degree of synchronous precision for reproducing accurate images at a remote location on a television receiver, more nearly perfect interlace is provided and precision in control of the blanking period is effected. In general the apparatus and method of the present invention is better adapted for development of synchronizing, blanking, and driving signals for use in an odd line interlaced scan type television transmission, which is acceptable for present United States standards and in its use of highly stable devices, and logic circuitry provides for deriving better control information.

Accordingly, an object of the present invention is to provide a television sync generator which will provide extremely accurate and reliable synchronization and wherein extremely high reliability and constant width and fixation of all pulses is provided.

Another aim of the present invention is to provide for a method and means for generation of television synchronization utilizing superior functioning switching, and incorporating transistors so that reliability is high, power requirements are lower and servicing is infrequent.

Another purpose of the present invention is to provide an apparatus and method for producing waveforms for the two respective fields of synchronization, for the two respective fields of blanking, and for vertical and horizontal drive waveforms, which waveforms will permit synchronization of television reception within very closely controlled limits and tolerances and which will provide for improved stability and accuracy in television broadcasting transmission.

Another object of the present invention is to provide a means and method to cause every single pulse length in a television synchronizing system to be preset and not subject to drifting, which will eliminate use of mono-stable or astable multivibrators, which will incorporate transistorized circuitry and which utilizes computer techniques for extreme accuracy in producing synchronizing signals.

Another aim of the present invention is to provide a superior means and method for furnishing the four signal waveforms for producing the timing and driving pulses required for composite television signal generation.

Another purpose of the present invention is to provide a means and a method for generating waveforms required for composite television signal generation wherein such waveforms are derived from computer type logic circuits, which circuits may make extensive use of transistors, semiconductor diodes, and printed wiring.

Another object of the present invention is to provide a synchronizing generator which will require relatively low power, which is adaptable to be utilized as a portable system and wherein operation is simplified to the extent of consisting only of selecting a desired position on a frequency control switch and turning on power thereby providing automatic operation once the required operating conditions have been set up.

Another aim of the present invention is to provide an improved transistorized sync generator which is adaptable to color broadcasting with the inclusion of a simple adaptor connection, which may be readily operated remotely and which will provide for accurately controlled and maintained amplitude and duration as well as timing relationship required for its four output signals of snyc, blanking, vertical and horizontal drive.

Another purpose of the present invention is to provide a synchronizing generator incorporating advantages of delay line triggering to provide extremely precise accuracy when timing the leading and trailing edges of each output waveform so that complex waveform outputs may be obtained which are extremely stable and accurate in time and duration.

Another aim of the present invention is to provide a television synchronizing generator which will provide standard synchronizing generator waveforms of extremely close accuracy and tolerance which waveforms have complicated structure of mixed horizontal and vertical signals, which generator will utilize binary counter and logic circuitry and provide the extreme precision derived from a delay line.

Another aim of the present invention is to provide a transistorized sync generator having a unique oscillator circuit wherein the oscillator frequency is independent of transistor characteristics and determined entirely by the crystal and which oscillator circuit may be operated in series resonance.

While the novel and distinctive features of the invention are particularly pointed out in the appended claims, a more expository treatment of the invention, in principle and in detail, together with additional objects and advantages thereof, is afforded by the following description and accompanying drawings in which:

FIGS. 1A, 1B, 1C, and 1D are combined and takes in side by side relationship in that order from left to right to present a schematic representation of an illustrative embodiment of the synchronizing generator of the present invention;

Figure 1A:
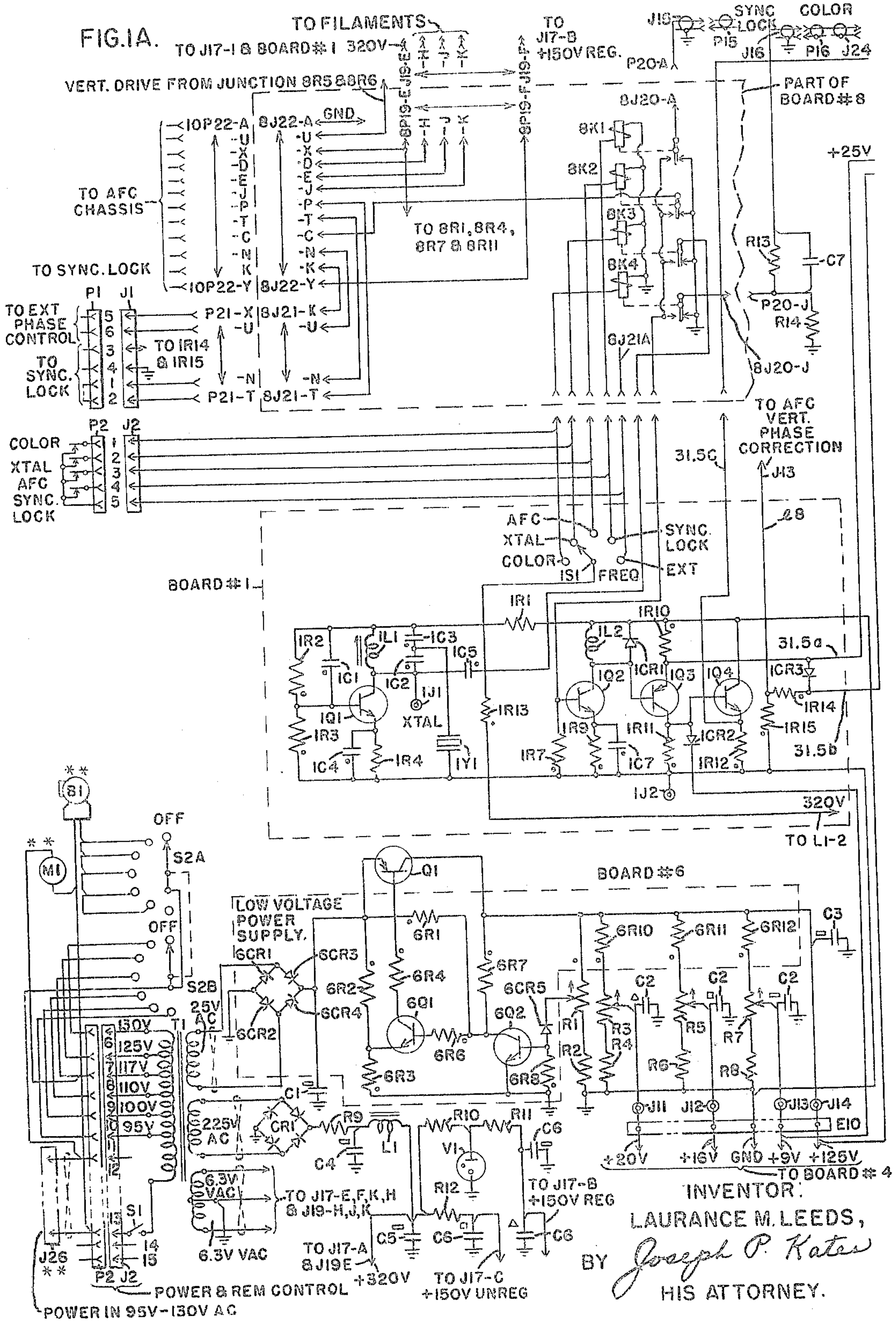
Figure 1B:
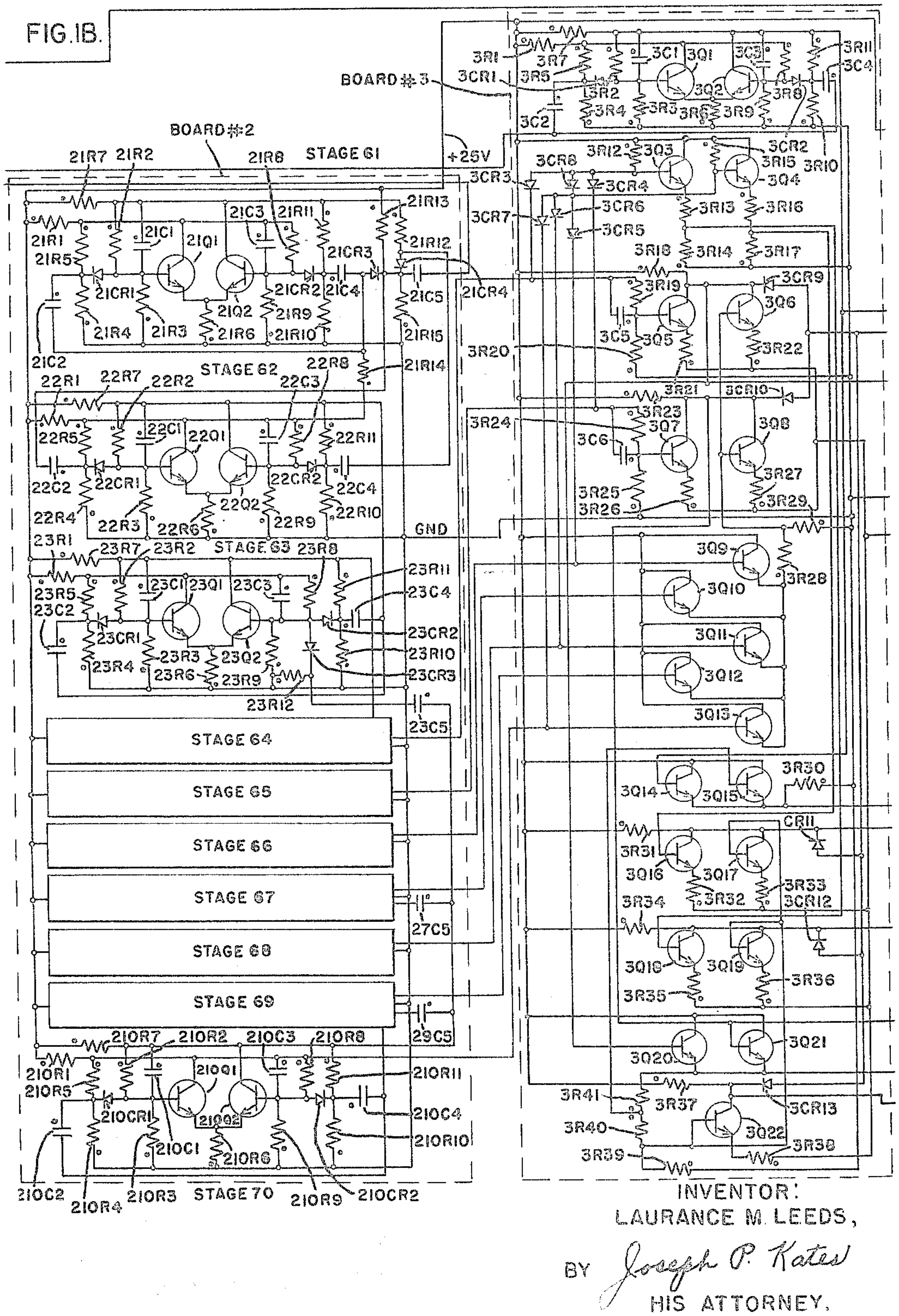
Figure 1C:
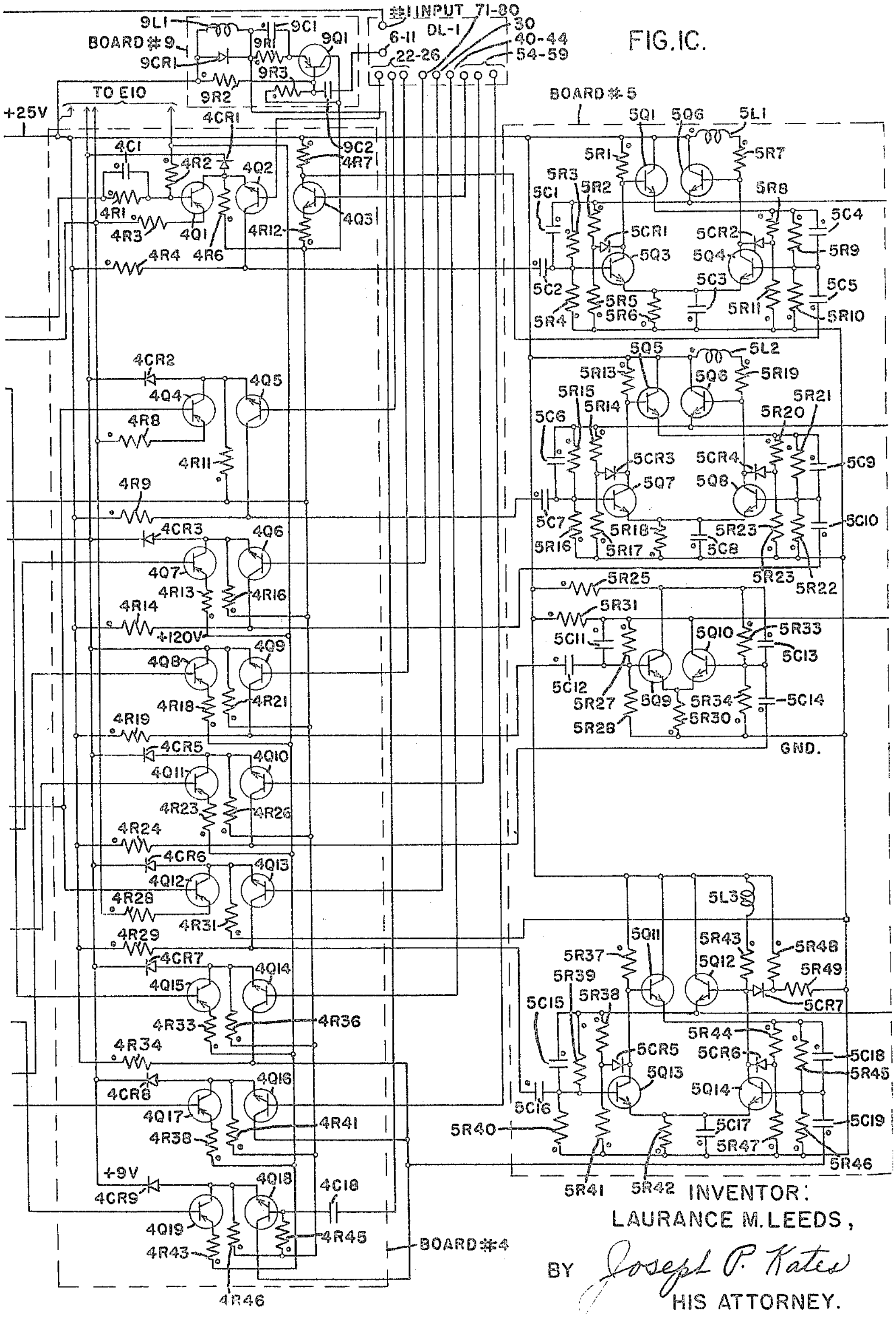
Figure 1D:
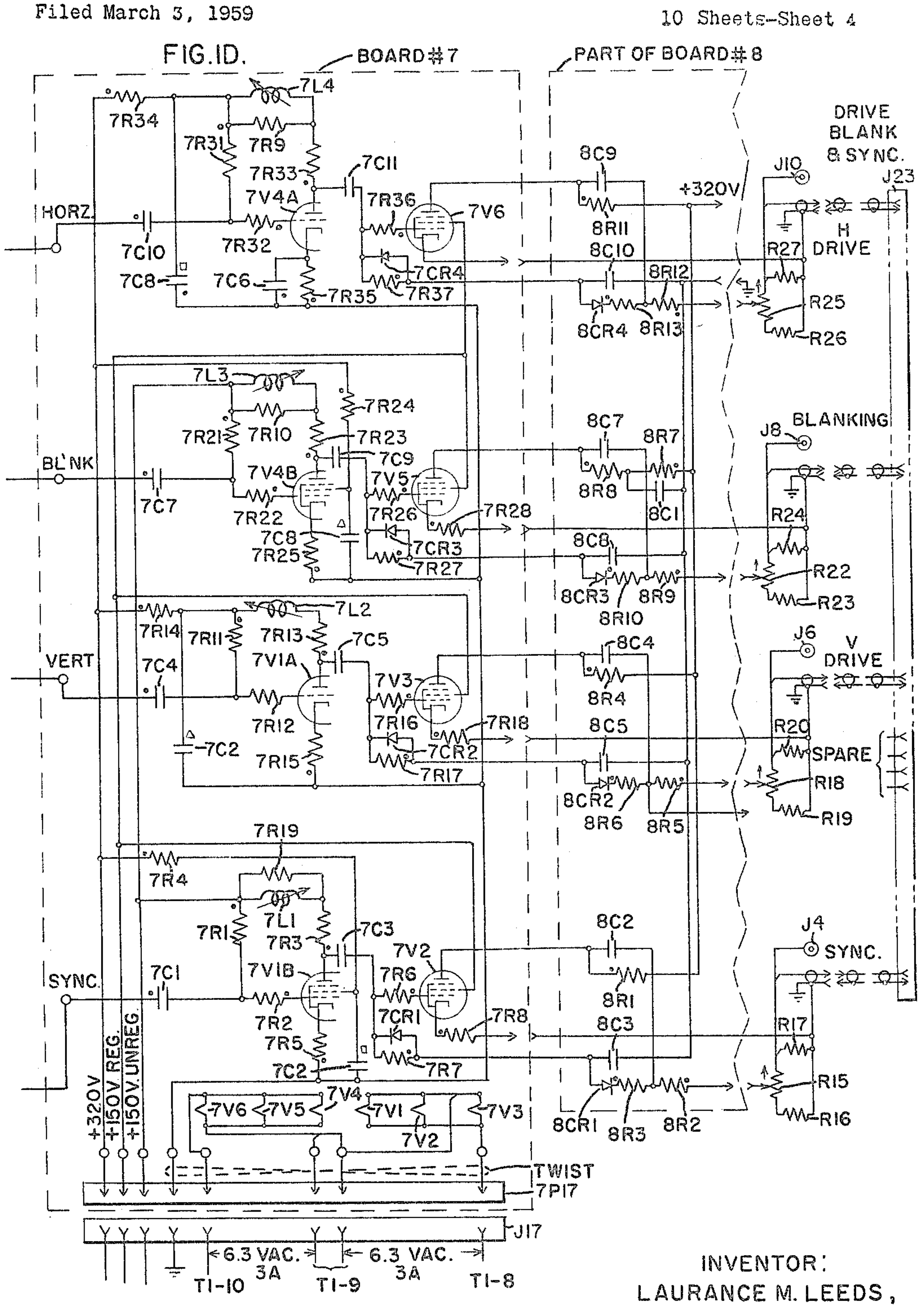

Of concern in the television industry is the methods and equipment based on the chosen commercial standards for both monochrome and color television. These present standards are based on recommendations of the NTSC (National Television Systems Committee) of the Radio, Electronic and Television Manufacturers Association (RETMA). Scanning is a fundamental part in the reproduction of visual information. The scanning in the pick up device and in a reproducing device or receiver must be in synchronism for the system to function at all and synchronism is required to be precise to provide as near perfect a system as is possible. Thus, there is required transmission of detailed information about the scanning process at the pick up device such that the information can generate identical scanning processing at the reproducing device. Transmission of pulses as an alternative to a possible system of transmission of scanning waveforms is the system adapted and involves transmission of synchronizing pulses timed so as to initiate sweep waveforms in circuits at a receiver in synchronism with similar waveforms at a pickup device. Thus, the scanning action is initiated. The scanning waveform is prescribed by a a mathematical equation and circuits which will generate such waveform within accurate tolerances can be built independently at both the transmitter and receiver.

Where a single transmission channel is used the time in which video information is transmitted cannot be used for transmission of synchronizing information since time is shared between both types of information. However, because finite retrace time is required for both horizontal and vertical sweeps during which time useful video information is not transmitted, this is utilized for the transmission of synchronizing information without adding to the total amount of time required for the transmission of a complete picture unit. Horizontal and vertical synchronizing information must be combined and there must be some means to prevent the vertical scanning generator from being triggered from a horizontal pulse and the horizontal scanning generator from being triggered by a vertical pulse. This is done by width separation of pulses. By utilizing differentiating circuits which respond only to the leading edge of pulses and integrating circuits which respond in a manner dependent upon the width of the pulses this can be accomplished. In such system a vertical synchronizing pulse unaffected by horizontal pulses can be obtained and horizontal synchronizing pulses will be affected only if the vertical pulse is wide enough to include one or more horizontals in which case during the vertical pulse horizontal synchronization could not take place. Loss of horizontal synchronization during transmission of vertical pulses is important even though it occurs during blanking time because of the transient behavior of practical horizontal AFC and sweep circuits. The difficulties of providing sufficient separation between horizontal and vertical pulses especially under extreme noise conditions are overcome by making the effective width of the vertical pulses several times that of the horizontal pulses and by providing serrations in the vertical pulses. In addition, interlace scanning must be provided for in the synchronizing generator and in a system such as in the present invention, this is accomplished automatically because the horizontal synchronizing circuits are permitted to run continuously with a relationship between horizontal and vertical repetition rate such that a vertical sweep starts after $W+\frac{1}{2}$ lines are scanned where $W$ is the whole number of lines. Therefore, a frame has $n=2(W+\frac{1}{2})$ lines. Vertical-field frequency is twice the frame-repetition frequency and horizontal scanning frequency is $n$ times the frame-repetition frequency.

Thus, in a 525-line interlaced system, 262½ lines are scanned during each vertical field. The vertical-field frequency is 60 c.p.s., the frame frequency is 30 c.p.s. and the horizontal line frequency is 30×525 or 15,750 c.p.s.

Each television station must have at least one sync generator to supply the precise timing pulses required for the above-described waveforms. Pulses should be accurate to ten millionths of a second. Picture quality received on home receivers depends upon these timing pulses and the sync generator of the present invention is designed to prevent drifting and the jagged lines otherwise seen on home television screens, to minimize picture flopover because of unstable operation of the device, to prevent or to lessen lost air time and to provide an improved and reliable transistorized apparatus minimizing necessity for precise programing. This inventive apparature is designed to provide the four signal waveforms which furnish the timing and driving pulse required for composite television signal generation. In the apparatus of the present invention the waveforms are derived from computer type logic circuits and the apparatus may make extensive use of transistors. The inventive synchronizing generator apparatus is divided into a crystal oscillator function, a delay line, a number of counter stages (which may be 10 in number), logic circuitry following these counter stages, a plurality of gated pulse amplifiers, a plurality of locked units, and may be powered by, for example, a 25 volt regulated power supply. Output amplifiers, and an emitter follower pulse sharpener may be provided in addition to the usual relays and blocking capacitors in such a device. The illustrative embodiment of the inventive synchronizing generator disclosed may require only A.-C. line voltage from 95 to 130 volts and may be powered by low and medium voltage D.-C. power supplies, wherein the low voltage 25 volts supply may be regulated and used for the transistor circuits and the medum voltage supply may furnish D.-C. voltages to the power amplifiers and relays. Such power supplies can operate efficiently with a plus or minus 10% line voltage variation. Master frequency remote control may be selected by a frequency control switch 1S1 marked color, crystal, AFC (automatic frequency control), sync lock, and EXT (external). Operation of the synchronizing generator may consist only of selecting the desired position on the frequency control switch 1S1 and turning on power. Operation may be automatic once the required operating conditions have been set up. The apparatus may also be used by locking into synchronization with a remote sync source by use of the sync lock provided.

Figure 2:
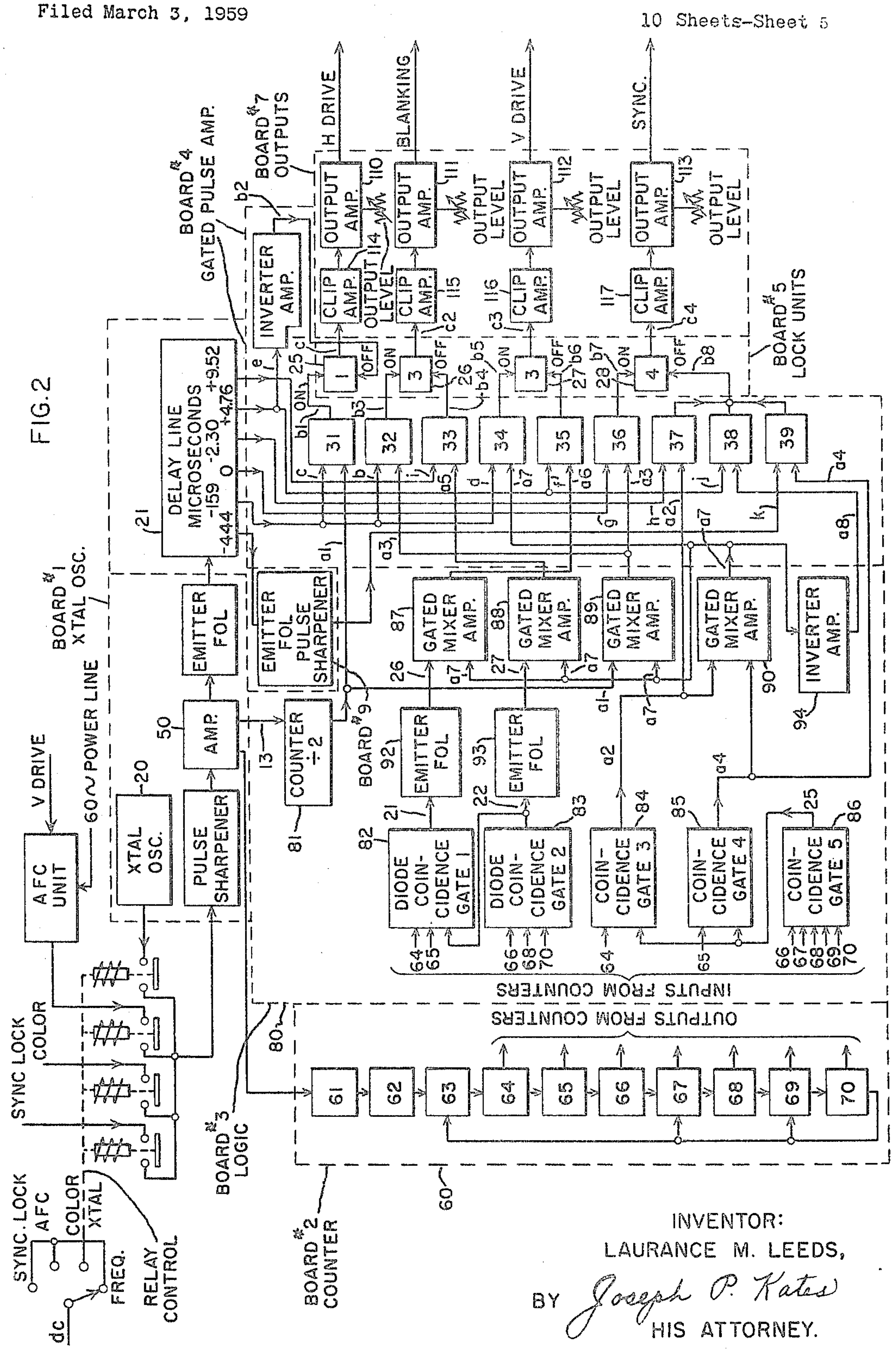
FIG. 2 is a detailed block diagram of the apparatus of FIG. 1.
Figure 3:
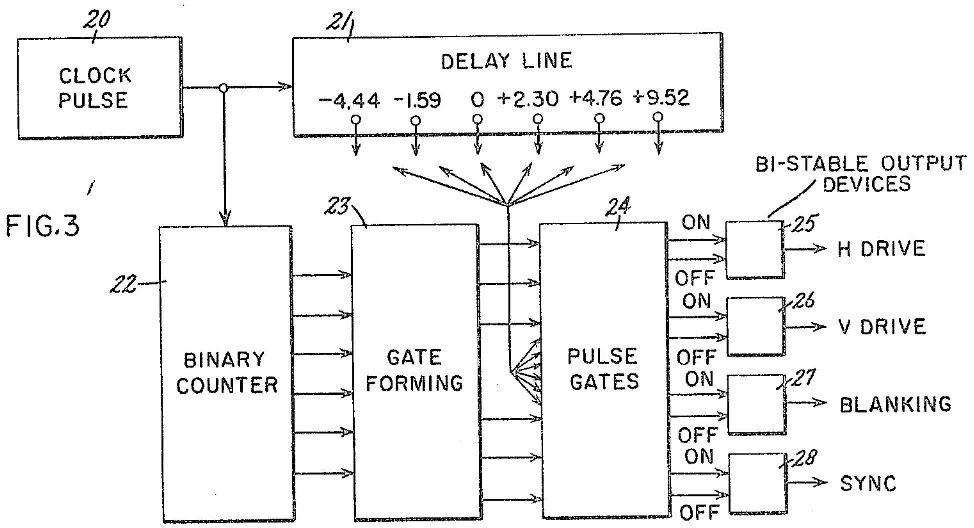
FIG. 3 is a simplified block diagram of the illustrative embodiment of the present invention shown in FIG. 2.

Referring now to the drawings and in particular to the simplied block diagram of FIG. 3, the basic signal forming elements of the synchronizing generator may comprise a clock pulse source 20 which may be operated at 31.5 kc., a pulse counter section 22 which may be a binary counter, a gate forming section 23, a delay line 21, and four bi-stable output devices 25, 26, 27 and 28 often called side tripped lock units. Association and combination of the elements shown in FIG. 3 is more completely shown in the more elaborate block diagram of FIG. 2 which illustrates how these elements are associated and combined to provide the output signals to the power amplifiers 110, 111, 112, 113. The following notes should be considered in interpretation of FIG. 4 and the numbered waveform designations for the desired standard output waveforms shown.

Figure 4:
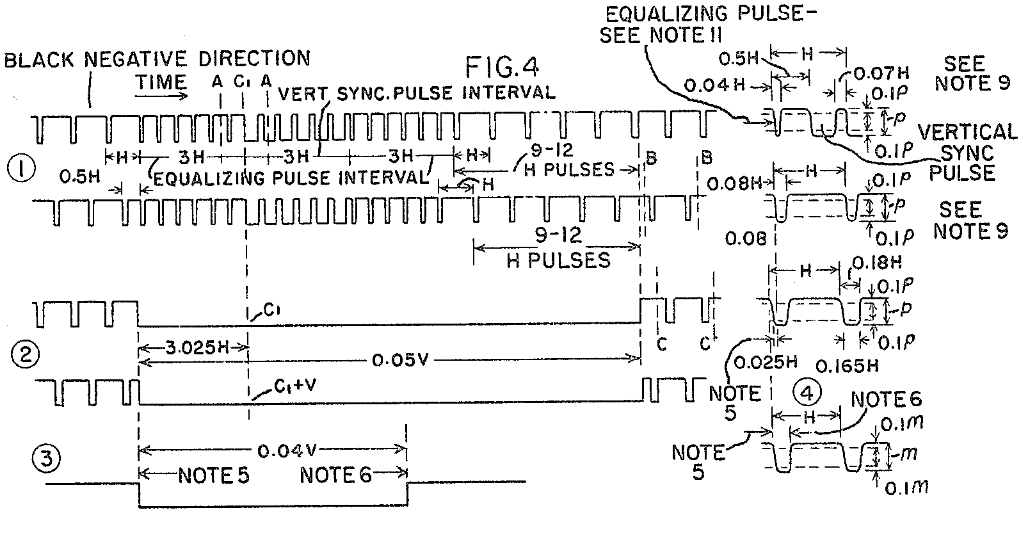
FIG. 4 is a diagrammatic representation illustrating standard synchronizing generator waveforms and certain required characteristics thereof.

Referring to FIG. 4, the circled numerals 1, 2, 3, and 4 refer respectively to (1), the synchronizing signal, (2), the blanking signal, (3), the vertical driving signal, and (4), the horizontal driving signal. The following notes are also made as to desirable requirements for the waveforms shown in FIG. 4.

Overall, all signal amplitudes should be adjustable over the range from 3.5 to 4.5 volts across a load impedance of 75 ohms plus or minus 5%. Negative signal polarity should be available for all pulses. The source impedance for all output circuits should be 75 ohms plus or minus 10%.

In detail the following factors are important and correspond to designations on FIG. 4 where marked:

(1) Horizontal time (H) should be considered from the start of the line to the start of the next line.

(2) Vertical (V) time should be considered from the start of one field to the start of the next field.

(3) The leading and trailing edges of vertical driving and vertical blanking signals should be complete in less than 0.1 horizontal (H).

(4) All tolerances and limits shown in FIG. 4 apply for long time variations only and not necessarily for successive cycles.

(5) The timing adjustment, if any, must include this condition of 0.025 H minimum.

(6) The vertical driving pulse duration should be 0.04 V. plus or minus 0.006 V. The horizontal driving pulse duration should be 0.1 H plus or minus 0.005 H.

(7) The time relationship and waveform of the blanking and sync signals should be such that their addition will result in a standard EIA (Electrical Industries Association) signal. The time relationship may be adjustable but should include this condition.

(8) The standard EIA values of frequency and rate of change of frequency for the horizontal components of the synchronizing signal at the output of the picture line amplifier should also apply to the horizontal components of the output signal from the synchronizing generator.

(9) All slope intervals should be measured between 0.1 and 0.9 amplitude reference lines.

(10) The time of occurrence of the leading edge of any horizontal pulse "N" of any group of twenty horizontal pulses appearing on any of the output signals from the synchronizing generator should not differ from "NH" by more than 0.0008 H where H is the average interval between the leading edges of the pulses as determined by an average process carried out over a period of not less than 20 nor more than 100 lines.

(11) The equalizing pulse area should be between 0.45 and 0.5 of the area of a horizontal sync pulse.

(12) The overshoot on any of the pulses should not exceed 5%.

(13) The output level of the blanking signal and the sync signal should not vary more than plus or minus 3% under the following conditions:

(A) The A.C. voltage supplying the sync generator should be in the range between 110 volts and 120 volts and must not vary more than plus or minus 5 volts during the test.

(B) In use of the equipment described in the illustrative embodiment of the invention, a period of five hours continuous operation should be considered adequate for the measurement of Note 13 after considerable warm-up of the equipment.

(C) The room ambient temperature in operation should be in the range between 20 degrees and 40 degrees centigrade and should not change more than 10 degrees centigrade during a test.

(14) Adjustment should be possible between minimum and maximum limits so that the aspect ratio can be set to its desired normal value.

Now, continuing to refer to FIG. 4, in which, as has been stated hereinabove, the standard sync generator waveforms are illustrated, there is specified the exact amplitude and duration as well as the timing relationship required thereof of the four output signals, sync, blanking, vertical drive, and horizontal drive. For further discussion of composition, requirements and derivation of each waveform of FIG. 4, reference is made to Fundamentals of Television Engineering, Glenn M. Glassford, McGraw-Hill Book Company, Inc., 1955, Chapters 12, 13 and 14 op. cit. Now again referring to FIGS. 2 and 3, each of these signals may be formed in its respective bi-stable output devices 25, 26, 27 and 28 (or lock unit), which devices may function by shifting between on or off conditions in accordance with precisely timed "turn on" and "turn off" pulses. The output signal forming devices as shown in detail in FIG. 1 may be bi-stable flip-flop circuits, with two stable states and two control points designated as the on input and the off input (see FIG. 2). A pulse incident on the on input will always shift the state of the circuit from state A to state B, providing it was resting in state A. Additional pulses at the on input will have no effect. However, a pulse incident at the off input will shift the state of the circuit back from state B to state A and subsequently additional pulses at the off input will have no effect. The on-off periods and timing of the bistable output devices or lock units 25, 26, 27 and 28 are controlled by their respective on-off gates which serve to pass or reject particular pulses in the total time train of pulses in accordance with the specific on-off requirements of each lock unit. For example, the vertical drive lock unit is required to be on for 21 clock pulses out of every 525 pulses (see A6, FIG. 5 and FIG. 2). The 525 pulses is the total time train of pulses per field at the twice horizontal rate of 31.5 kc. Referring to FIG. 2 each gate 31 through 39, has incident upon it a continuous train of pulses at a rate of 31.5 kc. from one of six delay line taps in the delay line 21. These taps are designated as minus 4.44, minus 1.59, zero, plus 2.30, plus 4.76 and plus 9.52. The 31.5 kc. input pulses passing through the delay line 21 are progressively delayed by increments as illustrated in FIGS. 2 and 3 from minus 4.44 to plus 9.52 micro-seconds. In other words, a particular clocked pulse from the 31.5 kc. crystal oscillator 20 in passing down the delay line 21 appears at each delay line output progressively delayed in the time scale. These pulses from the delay line outputs perform the actual triggering of the output devices. This may be ovserved in FIG. 2 wherein the lines from respective delay line taps in the delay line 21 are fed into the respective pulse control gates 31 through 39. The delay line pulses which are incident upon the respective pulse gates 31 through 39 serve to direct the pulses to turn on or off a particular one of the lock units 25, 26, 27 and 28 as required at that instant.

Figure 5:
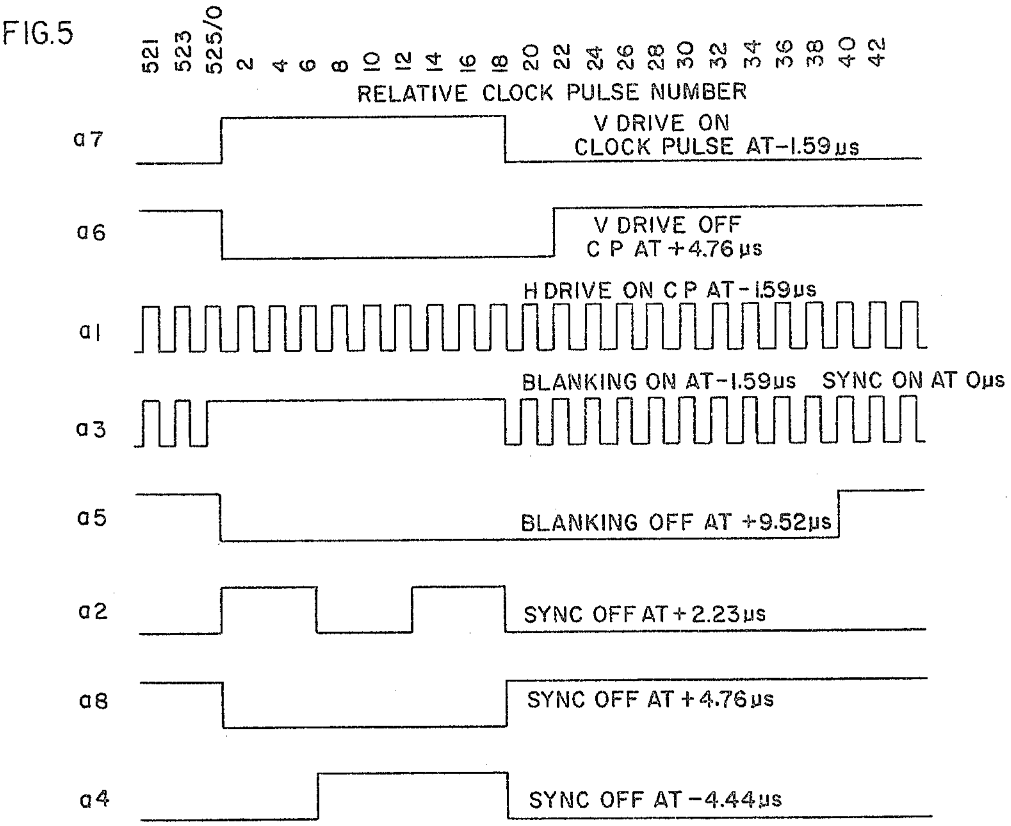
FIG. 5 is a diagrammatic representation of the input control gate signal waveforms generated by the illustrative embodiment of the apparatus of the present invention.
Figure 10:
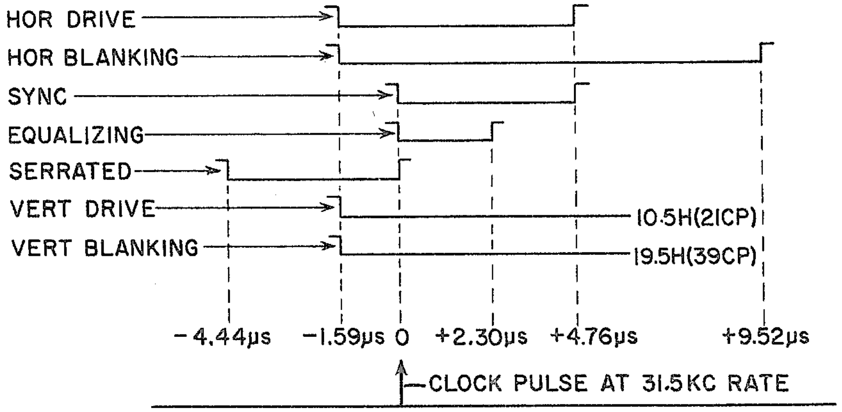
FIG. 10 is a diagrammatic representation of delay line time correspondence to output signals of the delay line of the illustrative embodiment of the present invention.

This above-described delay line triggering presents advantages in the extremely precise accuracy which can be obtained when timing the leading and trailing edges of each output waveform. This timing is illustrated in FIG. 10 wherein there is shown the timing relationship of the output waveforms with respect to the delay line taps 21. The length of the horizontal drive, horizontal blanking, sync, equalizing, and serrated pulses hereinafter described may be determined entirely by the delay line 21. For example, the leading edge of a particular sync pulse will be initiated by a clock pulse passing the zero micro-second output of the delay line, and the trailing edge of that same sync pulse will be initiated by the same clock pulse passing the 4.76 micro-second output of the delay line. This is shown in FIG. 10. As further shown in FIG. 10 there are two relatively long waveforms, vertical drive 21 clock pulses in length and vertical blanking 39 clock pulses in length. The leading and trailing edges of these waveforms may also be obtained from the delay line 21 with the information for the pulse gate simply delineating which particular clock pulse is effective. Incident on each pulse gate circuit 31 through 39 as seen in FIG. 2, is also an input derived from the prior logic circuits of the logic circuitry generally designated as 80. FIG. 5 which shows the control gate signal waveforms illustrates each incident waveform *a*1 through *a*8 shown in FIG. 2 with respect to the total pulse count of 525. Waveform *a*3, for example, may be incident upon both control gates 32 and 36 of the control gate circuit as shown in FIG. 2. Illustrated in FIG. 5 also is the delay line tap at which the clock pulse will operate to perform actual triggering of the respective gate pulse circuit 31 through 39 and the function of each of the waveforms is enumerated in that figure. In actuality, the effective delay line trigger may function a few microseconds after a gate opens. In each particular gate circuit 31 through 39, the respective waveform *a*1 through *a*8 permits the clock pulses from the delay line to pass when the gate signal to the respective gate 31 through 39 is relatively positive and will reject the clock pulse signals from the delay line when the respective gate of gate 31 through 39 is relatively negative. Referring again to FIG. 5, control signal *a*7, for example, is positive during the period of clock pulses from 525/0 and including 17 and thereby permits these clock pulses to be incident during that interval on the on input terminal at *b*5 to the vertical drive output signal forming lock unit 27. Meanwhile, as shown in FIG. 5 control signal *a*6 is denying pulses to the off input *b*6 of the lock unit 27. Actually, in accordance with the above explanation of the lock unit, only the first clock pulse 525/0 causes the transition to the on state. The succeeding 17 pulses do not alter the state since all off pulses are denied through waveform of *b*6. Control signal *a*6 lasts until count 21 and thereby at count 21 the first off pulse is permitted. Following this as seen by waveforms *a*6 and *a*7 off pulses continue up to and including count 524 but the additional pulses have no effect since the lock unit is already off. Since the on pulse occurred at a relative time of minus 1.59 microseconds from the delay line 21 and the off pulse occurred at a relative time of 4.76 microseconds from the delay line 21, the actual duration of the vertical drive on state is 21 counts of the clock pulse plus 6.35 microseconds or the addition of 1.59 microseconds plus 4.76 microseconds. Since the repetition rate of the clock pulse is at twice the line frequency rate, in order to provide interlaced scanning in terms of horizontal rate, the vertical drive signal is 10.5 times the horizontal (H) rate plus 6.35 microseconds.

Referring to FIG. 5, assuming that waveform *a*1 controls the pulses to the on input *b*1 of the horizontal drive output device 25, during the "even" field, correspondingly waveform *a*3 controls two gates, the on input *b*3 of blanking and the on input *b*7 of sync. On the following "odd" field, waveform *a*1 shown in FIG. 5 would appear inverted when referred to the relative count 525/0 and correspondingly waveform *a*3 which start the long count at 525/0 and end at clock pulse 19. This follows from the fact that there are an odd number 525 of twice horizontal rate pulses per field. The relationship between the odd and even fields of sync and blanking is shown in FIG. 4 at (2). In view of the structure of the mixed horizontal and vertical sync signal required, referring to FIG. 5 and FIG. 2, three control gates, 37, 38 and 39 are used to turn sync off. The action of the circuits involved will be explained hereinbelow.

*Deriving of gate waveforms*

Referring to FIG. 2, clock pulses of 31.5 kc. are fed from the crystal oscillator 20, through pulse sharpener 21, into amplifier 50, simultaneously to the delay line 21 through emitter follower 150 and also to the first stage 61 of the counter 60. Counter 60 may comprise the ten stages 61 through 70, inclusive, which is the minimum number required to provide a count of 525. The first two stages 61 and 62 are arranged to give a count of 3 through the use of pulse steering. The remaining 8 stages 62 through 70, inclusive, are pure binary, with each stage dividing the input count by 2. This arrangement has a register capability of 768 (3 times 256 or $3\times2^8$). That is, the first two stages 61 and 62 are a count by 3 set wherein an output pulse occurs every third count of the input pulses, and these stages operate on the principle of input pulse routing. The following 8 stages are pure binary operating on the preset principle. The total count cycle embraces 525 clock pulses ($525\times60=31{,}500$ or 31.5 kc.). The first two stages 61 and 62 as shown comprise a 3 counter and feed input to stage 3, 63 on every third count. The remaining stages must count 525 divided by 3 or 175, but it requires 256 counts to completely cycle an 8 stage pure binary counter. Assume that the throw-out pulse which is ejected from the 8 stage counter chain 60 of counters 63 through 70, inclusive, on its 256 input pulse is reintroduced into the counter chain 60 so as to preset the various stages to that set of states corresponding to the number 81. This preset follows immediately after the 256 count, hence on the next incident input pulse the counter chain 60 (counter 63) views this pulse as through it was the 82 pulse. Thus, the 8 stage chain is really counting on a repetitive cycle from a number 81 to a number 256 and the difference between 256 and 81 equals the required 175.

Figure 11:
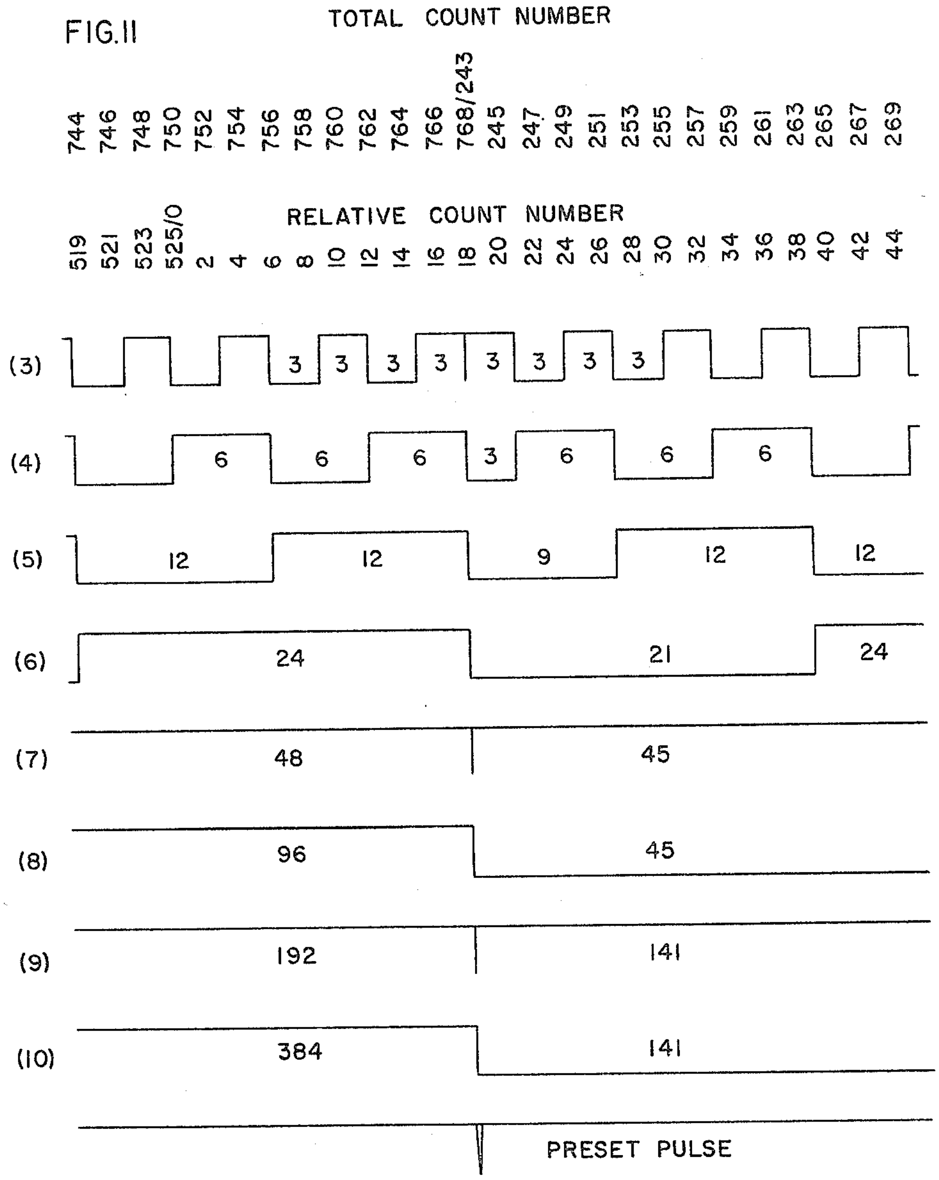
FIG. 11 is a schematic representation of the counter stage and logic waveforms of the illustrative embodiment of the present invention in relation to total and relative count members.

Considering all ten stages 61 through 70 of the arithmetic unit 60 and referring the count numbers to the incident count clock pulses, the total capability of the register is 768 or 3 times 256 and the preset number is 243 or 3 times 81. Thus, the entire arithmetic unit is counting 525 ($768-243=525$) on a repetitive cycle by counting from the number 243 to 768. As will be explained hereinafter, the particular bi-stable stages used change their state when the incident pulse is in the negative sense. Thus it is the negative going edge from each stage which, through differentiation, creates the transition pulse. The states which exist at the outputs of stages 3 through 8 plotted against the total count number in the region of the preset are shown in FIG. 11. For reference to action of such counters reference is made to Transistor Circuit Engineering—Shea, John Wiley and Sons, Inc., 1957, pp. 340 to 342.

Stage 3 counts in binary fashion with a count weight of 3 between each transition until the arrival of the preset pulse immediately following the 768 count number. At the 768 count, the output stage 3 goes relatively negative and causes a transition in stage 4, as shown in waveform 3 of FIG. 11, but immediately following this action a preset pulse resets stage 3 so that its output is again relatively positive. Stage 3 again changes state 3 counts later at count 236 and again causes a transition in stage 4. Thus, the injection of the preset pulse into stage 3 results in the count length of one of the transition intervals of stage 4 being reduced from 6 to 3, see waveform 4 between 768/243 and 246, of stage 5 from 12 to 9, see waveform 5 and stage 6 from 24 to 21, see waveform 6 (FIG. 11). Similarly the other waveforms are changed and it is noted that the preset pulse may be also injected into the 7th and 9th stages as shown in FIG. 11 (the 7th and 9th stages are stages 67 and 69 shown in FIG. 2). Since the counter operates on a 525 count repetitive cycle, the vertical interval which occurs once per cycle can be started at any count number in the cycle. In the embodiment shown the start may occur at the vertical interval at the count 750. With reference to this count as the 525/0 count, as shown in the vertical dashed lines of FIG. 6, the set of transitions occurs at count lengths of 6, 12, 18, 21 and 39. Thus, the arithmetic unit has been so arranged that all of the required information for the formation of the control gate signals is contained in the arithmetic unit and available as unique states.

Figure 6:
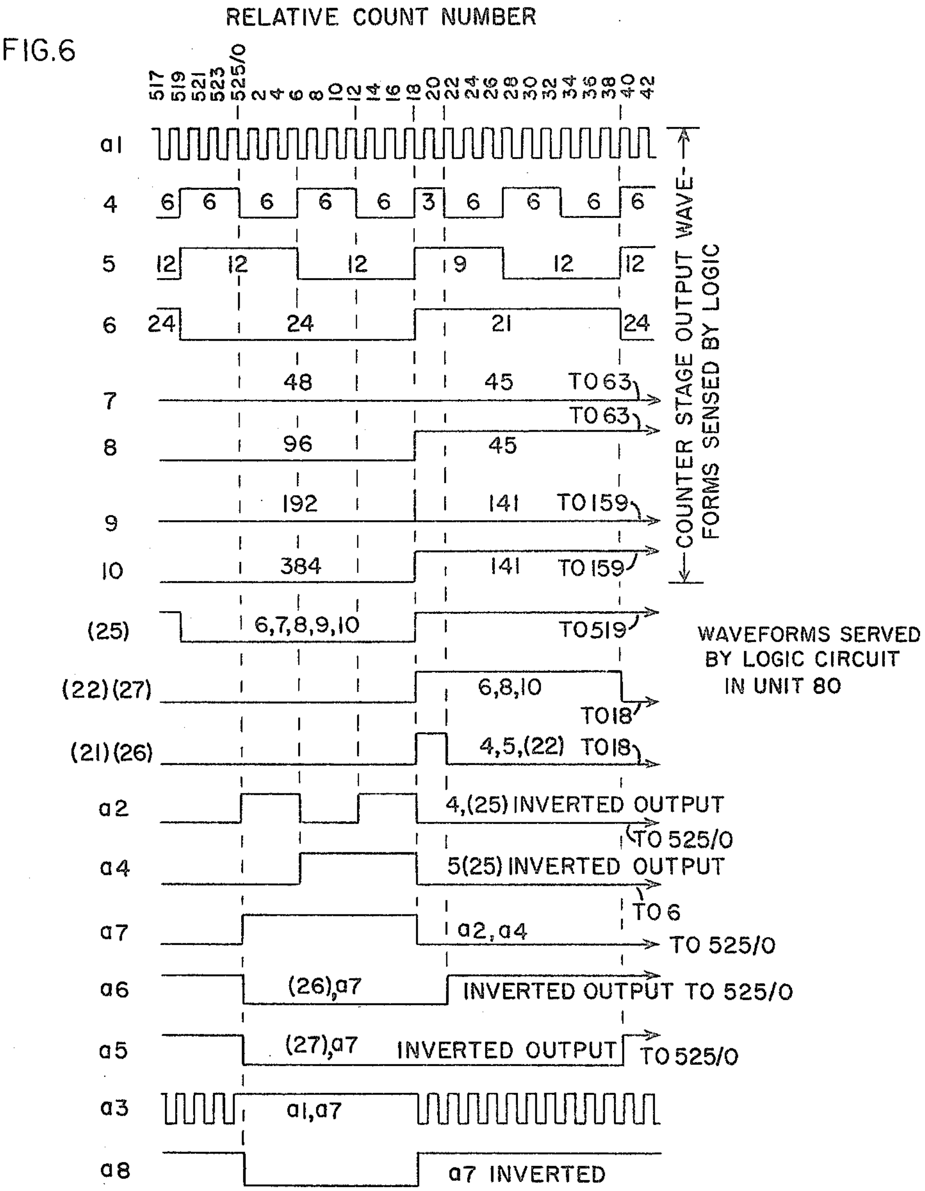
FIG. 6 is a diagrammatic representation of the counter stage output waveforms sensed by the logic circuits and the logic circuit output waveforms of the illustrative embodiment of the present invention.

Restating, through the employment of a preset pulse, the binary stages 61 through 69 are caused to start the count from a preset number resulting in a count between the numbers of 243 and 768, the difference being the required count of 525. The specific counter circuits will be described hereinbelow. As shown by referring to FIGS. 5, 2, and 1, all gate forming information may be obtained from the counter stages 61 through 70 by sensing the states of the various collectors of the transistors of the binary stages and the intelligence may be conveyed by indication as to whether a particular combination is relatively high or low in potential. FIG. 6 shows the output waveforms of the counter stages 61 through 70 inclusive, which are sensed by the logic circuits in unit 80, the only exception being waveform *a*1, which is the sensed output of the divide-by-two binary stage or divide-by-two counter 81 responsive to output of the crystal oscillator amplifier 50. As hereinbefore described, in the embodiment shown, this output will appear inverted on the alternate fields (see also FIG. 4, (1) and (2)).

The outputs of stages 64 through 70 may be sensed by five coincidence gate circuits 82, 83, 84, 85 and 86, of which two, 82 and 83, may be diode circuits, and three, 84, 85 and 86, may be transistor circuits. The unique characteristic of the coincidence gates utilized in the illustrative embodiment is that all inputs must be in the same sense, relatively positive or negative, in order for the output to be in that sense. For example, the inputs from stages 66, 67, 68, 69, and 70 may be fed to coincidence gate 86, as shown in FIG. 2. These may be all sensed in the negative polarity, and consequently the output from gate 86 will be negative, as shown by waveform 25 in FIG. 6. Following the coincidence gates 82, 83, 84, 85, and 86 may be four gated mixer circuits 87, 88, 89, and 90 which may be considered as the opposite of the coincidence gate circuits. That is, in the gated mixer for positive signals, if *any* input is relatively positive, then the output will be relatively positive, and conversely, thus, the gated mixers operate as "or" circuits. FIG. 6 shows the waveform *a*1 through *a*8 of FIG. 5, and also indicates the combination of coincidence and gated mixer circuits outputs, as well as that of emitter followers 92 and 93, inverter 94, and divide-by-two counter 81 required to form the gate waveforms incident on the pulse gate circuits 31 through 39 inclusive. The timing relationships are shown in relation to the total clock pulse count of 525.

*Circuit analysis*

Referring now to FIG. 1 of the drawings and the details of the circuit of the illustrative embodiment of the present invention, clock impulses at 31.5 kc. (kilocycles/sec.) rate may be provided by a crystal oscillator circuit comprising stage 1Q1 and associated components including a crystal 1Y1. The piezoelectric crystal 1Y1 may be operated in series resonance at 31.5 kc. and may be connected in the feedback path of the oscillator making it impossible for feedback to occur at any frequeny other than at the crystal resonant frequency. The 31.5 kc. sine wave output of the crystal oscillator is selected when relay 8K3 is energized and the frequency control switch is in crystal position. Alternatively, the 31.5 kc. signal could be obtained by energizing relays 8K1, 8K2, or 8K4 when suitable 31.5 kc. signal inputs are furnished to them. The output of transistor 1Q1 of 31.5 kc. may be applied to the base of stage 1Q2 which may be a transistor stage whose collector load may comprise inductor 112 shunted by the diode 1CR1. The diode 1CR1 prevents the leading edge of the input signal from initiating a train of oscillations at the collector, the diode permitting only the first negative swing of the collector oscillation to take place by rapidly dissipating the remaining coil energy when the coil voltage tries to swing positive. A negative output pulse is produced at the collector of stage 1Q2 which is approximately 2 microseconds at its maximum width. The output at the collector of stage 1Q2 may be fed to the base of stage 1Q3 which may be a PNP transistor, the output of stage 1Q2 being directly coupled from its collector to the base of stage 1Q3. Stage 1Q3 may have two outputs of which the collector may be a 2 microsecond wide positive pulse which may be clamped by the low-impedance diode 1CR2 so that the pulse does not exceed 9 volts. The positive collector pulse from stage 1Q3 may drive an emitter follower stage 1Q4 whose output labeled 31.5*c* may be direct-coupled to the delay line 21. The output at the emitter of stage 1Q3 is a negative pulse similar to the base input pulse. This output pulse labeled 31.5*a* may be used to drive the alternate counter stages 3Q1 and 3Q2 of the alternate or divided-by-two counter 81. The output labeled 31.5*b* (similar to 31.5*a*) provides the input trigger to the counter circuitry (Board #2. It is applied from resistor 1R14 to the input of stage one of the counter 21Q1 and 21Q2 through capacitor 21C5. Output 31.5*b* of transistor stage 1Q4 may be interrupted by applying a suitable positive voltage at the point labeled *e*8 from the AFC vertical phase correction so as to bias diode 1CR3 off and thus prevent pulses from being conducted through that diode. This interruption facility may be used in conjunction with vertical pulse correction obtained from a Sync Lock Unit (not shown).

*Counter stages*

As hereinbefore explained, stages 61 and 62 of the counter stages 61 through 70 inclusive use pulse routing to secure a division or count of 3. The binary counter stages 64 through 70, inclusive, each act to secure a count of 2. The binary stage may be basically a bi-stable flip-flop circuit which may comprise two NPN triode transistors. Referring to stage 70 for purposes of illustration wherein the stages 210Q1 and 210Q2 form a binary stage, the circuits have two stable conditions of equilibrium, where one section is cut off and the other is conducting, and the reversal. Either of these conditions will abruptly reverse very fast upon application of a suitable trigger. The trigger inputs to each section are applied through capacitors 210C2 and 210C4, which are connected to networks which differentiate the applied pulse. Diodes 210CR1 and 210CR2 respectively route the negative pip applied to the conducting transistor ony. The positive differentiating pip of the input signal is blocked by the diodes 210CR1 or 210CR2 from triggering either transistor. Thus, only negative-going edges of input pulses trigger the counter stage 70. The shift from one stable condition to the other of the stage 70 described is accomplished as follows:

Diode 210CR1 or 210CR2 associated with the base of the particular respective transistor 210Q1 or 210Q2 which is conducting at the given time is also in a conductive state while the diode assocaited with the base of the non-conducting transistor is also non-conducting. When the negative triggering pip is applied to both diodes by means of the input networks, it is blocked from the base of the non-conducting transistor, but the pulse causes the current in conducting transistor to decrease, thus causing a rise in collector voltage. This rise is coupled to the base of the transistor which was not conducting, causing collector current to begin flowing, thus lowering its collector voltage. This voltage drop is transferred to the base of the opposite section, where it reinforces the action initiated by the trigger pip. This action is cumulative, and results in the transistor which was conducting to become cut off, and the transistor which was cut off to become conducting. Another trigger pip will reverse this action, returning the counter stage to the condition which existed before the application of the first of the two triggers. The binary stage has then gone through one complete cycle of operation upon the application of two triggers, thereby yielding a division of two. This flip-flop operation is accomplished almost instantaneously upon the application of the triggering signal.

The output of each stage is a square wave having one negative and one positive-going edge per cycle. However, only the negative-going edge will trigger a directly connected succeeding binary stage. Therefore, when one binary stage is connected directly to the input of a second stage, the second stage is triggered once for each cycle of operation of the first stage, resulting in a division of four at the output of the second stage. Similarly, additional cascaded stages yield total divisions which are integral powers of two. For example, eight cascaded binary stages yield a total count or division of $2^8$ or 256. Stages 63 through 70 of the binary counter 60 are pure binary. However, the count cycle is modified from 256 to 175 by introducing the output of stage 10 into stages 3, 7, and 9, as hereinbefore described, thus presetting these stages so that 175 input triggering pulses are required at stage 3 for one output at stage 10.

Figure 7:
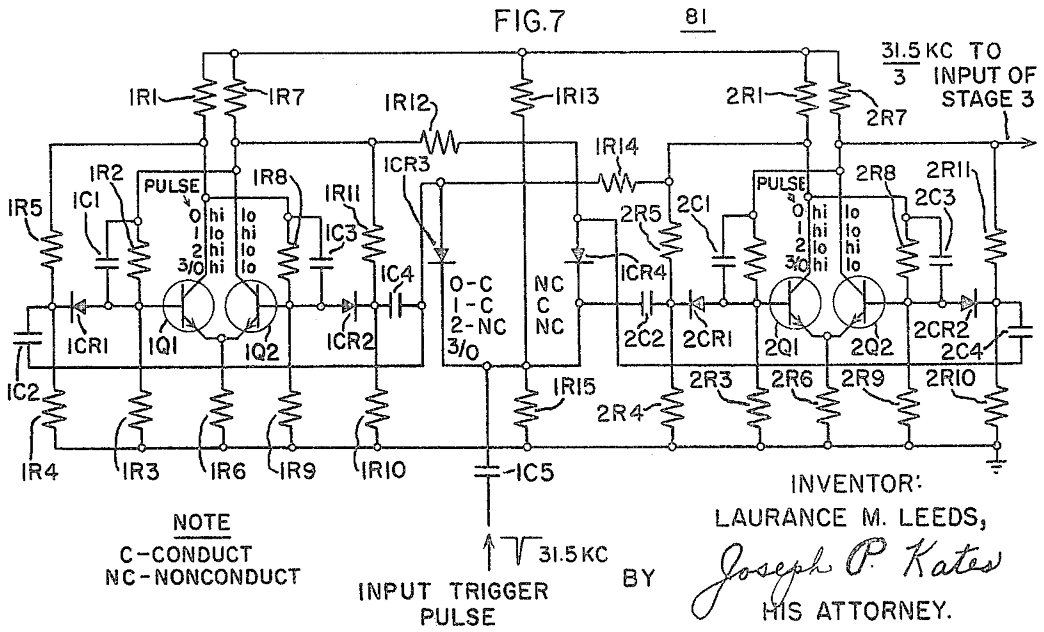
FIG. 7 is a schematic representation of counter stages 61 and 62 of the illustrative embodiment of the present invention.

As explained, stages 1 and 2 use pulse routing to secure a division or count of 3 rather than 4, as is the case with the straight binary circuits. FIG. 7 shows stages 1 and 2 drawn in slightly different form than shown in FIG. 1, in order to facilitate explanation of the interaction between the two stages. The input trigger is a narrow 31.5 kc. pulse taken from the **31.5*b* output of transistor stage 1Q4. This is shown applied through capacitor 21C5 in FIG. 1. Diodes 1CR3 and 1CR4 are the basic routing elements. The cathode connection of both routing diodes 1CR3 and 1CR4 may be held at approximately 20 volts by a voltage divider. Conduction of transistor stage 1Q2 results in a collector voltage of approximately 10 volts, so that diode 1CR4 is cut off. When stage 1Q2 is cut off, its collector voltage may be approximately 25 volts and diode 1CR4 conducts. There is a similar relationship between transistor stage 2Q1 and 1CR3**. An operational cycle takes place as follows:

Assume that the right-hand transistor shown in FIG. 7, stage 1Q2 and 2Q2 of each binary stage is initially conducting. The voltage conditions are those shown in FIG. 7 for the pulse 0 state. The first pulse is routed through diode 1CR3 to interchange the states of transistors 1Q1 and 1Q2. Since diode 1CR4 is biased non-conducting and since stage 2Q1 is non-conducting, this pulse causes no change in the states of transistors 2Q1 and 2Q2. Voltage conditions are now shown under pulse 1 of FIG. 7. The second pulse is again routed through diode 1CR3 to reverse the states of transistors 1Q1 and 1Q2. Since diode 1CR4 is now conductive, the states of transistors 2Q1 and 2Q2 are also reversed. This condition is shown under the designation pulse 2 of FIG. 7. The third pulse is blocked from triggering transistors 1Q1 and 1Q2 so that the state of conduction remains. Since transistor 2Q1 was previously conducting, the applied trigger results in this stage interchanging states as indicated under pulse 3 of FIG. 7. The counter has now returned to the set of conditions which existed prior to the application of the first of the three 31.5 kc. trigger pulses. The two stages have now gone through one complete cycle of operation upon the application of three triggers, thus giving a division of three at the output. The ouputs of stages 64 through 70 which are applied to the logic circuit stages 82 through 86 are shown in FIG. 6.

*Logic circuits*

All gate forming information is obtained from the stages of the binary counter 81 by sensing the states of the various collectors of the transistors in the individual binary counter stages 61 through 70 as to whether a particular combination is relatively high or relatively low in potential. This sensed information is then processed in the logic circuitry wherein diode logic circuits and transistor circuits may be utilized. The logic functions employed in the logic circuitry are those of coincidence, gated mixer, and inverter circuits. The logic circuits are quite simple and highly reliable and the gate forming combinations of the logic circuits are fixed and predetermined. The logic circuits generate waveforms which result in information of logical operations to generate pulse gate control signals. The inputs from counter stages 66, 67, 68, 69, and 70, referring to FIG. 2, are fed to a coincidence circuit 86 and are sensed as relatively negative signals. These five input signals swing between potential levels of +20 and +10 volts. The common emitter connection of stages 3Q9 thru 3Q13, referring to FIG. 1, will deliver the relatively negative output of +10 volts only when each of the five inputs to the bases of the transistors is +10 volts. When one or more of the inputs is at +20 volts, the common output will be +20 volts. As shown in FIG. 6 (waveform 25), the relatively negative condition occurs at the count of 520 and continues through count 19. Waveform (25) hence has a positive portion from 517 to 520, a negative going portion from 520 to count 19, and a positive going portion therefrom to count 519 as stated.

The common output of coincidence gate 86, comprising waveform 25, is applied to coincidence gates 84 and 85 simultaneously, coincidence gates 84 and 85 comprising stages 3Q7, 3Q8 and 3Q5, 3Q6, respectively, referring to FIG. 1, and these circuits function as coincidence circuits for relatively negative signals, but with inverted output. Also incident on coincidence gate 84 is the output from counter stage 64; and incident on coincidence gate 85 is the output from counter stage 65, the waveforms also being shown in FIG. 6. Since coincidence gates 84 and 85 are alike, only the functioning of coincidence gate 84 will be described. Referring now to FIG. 1, again, the emitter of stage 3Q6 is returned to +9 volts. The collector is clamped by diode 3CR9 so that it cannot go below +15 volts, and the input signals to stage 3Q6 swings between +12 and +6 volts, divided from 20 volts and 10 volts respectively by the voltage divider comprising resistors 3R28 and 3R29. When the input signal is in its relatively negative state, at +6 volts, stage 3Q6 will be cut off and the collector will be at +25 volts. A +12 volt input will put stage 3Q6 well into conduction, causing its collector potential to fall far enough to be clamped at +15 volts. Thus, the output is in the inverse sense to the input, and additionally, the output has been restored so that it swings between two accurately determined potentials. With stage 3Q5 also acting as a simple inverter, a coincidence circuit for relatively negative signals is formed, but with inverted output. The divider resistors 3R19 and 3R20 in the input from counter stage 64 reduces the 20/10 swing to 12/6. Coincidence will occur only when both stages 3Q5 and 3Q6 are cut off. Thus, the relatively positive output of +25 volts coincides only when both inputs are relatively negative.

The output waveform from coincidence gate 84 is shown at *a2* in FIG. 6 (see FIG. 2). This output is fed directly to pulse control gate 37 shown in FIG. 2 and is also an input to the gated mixer circuits or gated mixer amplifier 90 or stages 3Q20 and 3Q21. Similarly, the output from coincidence gate 85 (*a*4) is fed directly to pulse control gate 39, and is also the second input to the gated mixer circuit or gated mixer amplifier 90 which comprise stages 3Q20 and 3Q21. The output *a*7 of gated mixer amplifier 90 is relatively positive when either input is relatively positive. Output *a*7 becomes the input to pulse gates 34; one of the inputs to gated mixers 87, 88, and 89 or 3Q14 and 3Q15, 3Q16 and 3Q17, 3Q18 and 3Q19; and is inverted by inverter amplifier 94 comprising stage 3Q22, whose output, *a*8, is fed to pulse gate 38. The output *a*7 is divided by resistors 3R39, 3R40 and 3R41 to provide the correct voltage swing for each of the gated mixers 87, 88, and 89 inputs. The outputs of the gated mixers 87, 88, and 89 or stages 3Q14 and 3Q15, stages 3Q16 and 3Q17, and stages 3Q18 and 3Q19, are *a*6, *a*5, and *a*3 respectively; these are the inputs to control gates 35, 33, and 36 respectively and also the output from gated mixer 89 is fed to control gates 32.

Coincidence gates 82 and 83, which are diode coincidence gates, differ from coincidence gates 84, 85, and 86, in that the diode coincidence gates function as coincidence gates for relatively positive signals, and employ crystal diodes instead of transistors. Input signals from counter stages 66, 68, and 70, are fed to coincidence gate 83, composed of diodes 3CR5, 3CR6, and 3CR7. Each input swings between potentials of +20 and +10 volts, and the circuit will deliver an output of +20 volts when all three inputs are +20 volts. The output waveform is shown at (22) in FIG. 6, where it is seen that the three inputs (6, 8, 10) go relatively positive at count 18. The output from coincidence gate 83 is fed through the emitter follower 93 or stage 3Q4 to become one of the inputs to the gated mixer amplifier 88 or stages 3Q16 and 3Q17 and one of the inputs to coincidence gate 82, composed of diodes 3CR3, 3CR4, and 3CR8. The other two inputs to coincidence gate 82 are from counter stages 64 and 65. The output (21) from coincidence gate 82 is fed through emitter follower 92 or stage 3Q3 to gated mixer amplifier 87 which is stages 3Q18 and 3Q19. The waveform progression is shown in FIG. 6.

A simple binary counter comprising stages 3Q1 and 3Q2 or counter 81 which is a divide-by-two counter is used to divide the 31.5 kc. clock pulse to 15.75 kc, which is the line rate to provide input *a*1 to gated mixer amplifier 89 or stages Q14 or stages Q15 and also to the pulse control gate 31 of the pulse control gate circuitry.

*Control gate circuits*

Figure 8:
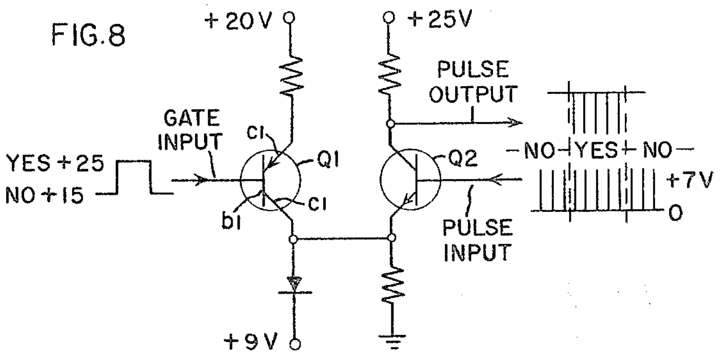
FIG. 8 is a schematic representation of the pulse gate circuit incorporated in the illustrative embodiment of the present invention.
Figure 9:
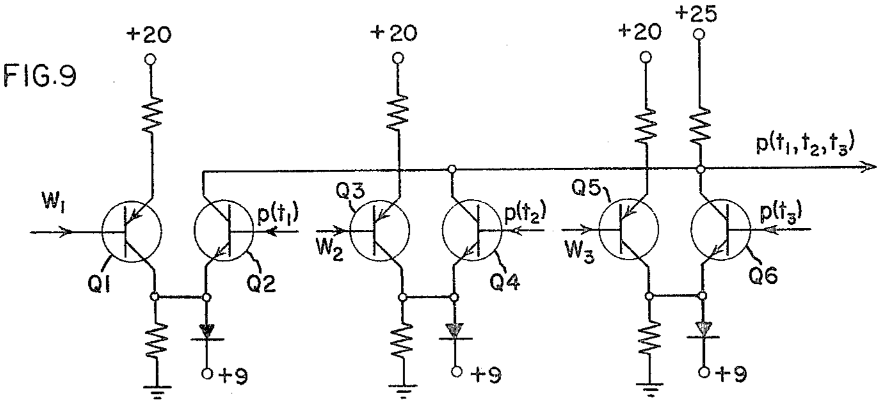
FIG. 9 is a schematic representation of the control gate pulse mixing circuit of the illustrative embodiment of the present invention.

The pulse gate circuit utilized in the apparatus of the present invention is described in detail in my copending application, Serial No. 767,142, filed October 14, 1958, these produce the pulse signals which initiate the transitions of the side-tripped lock units and the pulse signals which initiate these transitions are passed or rejected by the pulse gates. FIGS. 8 and 9 of the present application correspond to figures of the above-described copending application for Letters Patent wherein the action of this circuitry is described in detail as well as that of the control gate pulse mixing circuit. Each gate has a control input from the logic circuitry and a pulse input from the delay line. For example, referring to FIG. 2, it will be noted that the minus 4.44 output from the delay line is fed through the emitter follower pulse sharpener 100 into control gate 39 and from the delay line at 0 is fed signal *g*. Similarly, signal *c* is fed into pulse gate 31 from the minus 1.59 point on the delay line and continuing further from the minus 1.59 point is the *b* input into pulse control gate 32. These pulses together with the input from the logic circuitry provide a negative output for the input to the side tripped lock units 25, 26, 27 and 28.

*Lock units*

Stages 5Q9 and 5Q10 illustrate a basic circuit for a bistable output device. The circuit comprises a binary stage with the input circuit separated and may also be referred to as side-tripped lock unit. Assuming that stage 5Q9 which may be a three element transistor having a collector, a base and an emitter is in conduction, in which case its collector potential will be relatively low, the low collector potential of stage 5Q9 is cross-coupled through a voltage divider comprising resistors 5R33 and 5R34 to the base of stage 5Q10, holding stage 5Q10 in a non-conducting condition. Since stage 5Q10 is non-conducting, its collector potential will be relatively high. This potential is coupled to the base of stage 5Q9 through a voltage divider comprising resistors 5R27 and 5R28, to hold stage 5Q9 in the conducting condition. Thus, the action is regenerative, and either stage 5Q9 is on and stage 5Q10 is off or vice versa. A negative pulse incident on the base of the conducting transistor, either 5Q9 or 5Q10 will always turn this transistor off, and through the regenerative action, turn the other one on in a very short time. It is noted that when a train of pulses is applied to the conducting transistor, only the first pulse will cause the transition of state to the off condition, and all succeeding pulses of the train will be ignored, since that transistor is already off. A reversal of state can come about only by applying a pulse to the opposite side. The transition takes place in the order of 0.8 to 1.0 microsecond.

In the event a transition time of 1.0 microsecond is not fast enough as occurs in some applications, the transition can be speeded up by introducing modifications. As used in the lock unit circuit for horizontal drive, blanking, and with some further modification sync, stages 5Q1 and 5Q2 in the horizozntal drive lock unit are emitter followers placed in the cross-coupling circuits so that they act as low impedance sources in supplying the charging currents. The collectors of stages 5Q3 and 5Q4 are clamped by diodes 5CR1 and 5CR2 so that they connot go below approximately 12 volts. To aid in sweeping out the clamping diodes, these are returned to half-way points on the emitter follower resistors 5R2 to 5R5, and 5R8 to 5R11 in such a connection that as the negative diode terminal is being lifted in a positive direction, the positive terminal of the diode is being driven in a negative direction. These two modifications of emitter followers and collector clamps cause speed up in transitions. However, the turn-off transition of either stage 5Q3 or stage 5Q4 will still take appreciably longer than the turn-on transition. The concern is with the turn-off of stage 5Q4, since the output is taken from its collector through the emitter follower 5Q2. Therefore, a small peaking coil inductor 5L1 is tends to give an unwanted positive overshoot which 5Q4 to speed up the turn-off. However, inductor 5L1 tends to give an unwanted positive overshoot which must be corrected. This is done as follows:

As the base of stage 5Q2 tends to rise above 25 volts, the collector junction becomes forward biased and serves as a clamp. The result of this is that the turn-on transition goes through a 10 volt change in about 0.15 microsecond, and the turn-off goes through the same voltage change in about 0.3 microsecond.

*Output amplifiers*

The outputs of the four lock units 25, 26, 27 and 28 shown in FIG. 2 are fed to respective power amplifiers 110, 111, 112 and 113 through clipping amplifiers 114, 115, 116 and 117. The output amplifier circuits may employ tubes in order to facilitate obtaining the required output currents and rise times. Each of the four amplifier circuit outputs are similar but they may differ in that two stages may use 6AU8 triode sections as output drivers, while the other two stages may use the pentode section. In the power amplifier circuits design may be effected so that the output pulse amplitude is practically independent of filament voltages and tube characteristics.

Referring now to the horizontal drive output circuit, shown in FIG. 1, comprising tube stages 7V4A and 7V6, stage 7V4A is operated as a zero-biased high-gain video amplifier. Negative pulses from *c*1 are conveyed from the emiter of stage 5Q2 through coupling capacitor 7C10 and produce large positive pulses in the plate circuit of stage 7V4A. These pulses are limited to the breakdown voltage of a diode 7CR4 which may be a Zener reference diode connected in the grid input circuit of stage 7V6. The negative output pulse in the plate circuit of stage 7V6 may be fed to the horizontal drive output network, shown in the upper right-hand corner of FIG. 1, and in addition, is rectified by diode 8CR4 to produce a filtered negative voltage at the grid circuit return of stage 7V6. Thus, a self-regulating, or AGC action takes place in that gain variations in the output tube, 7V6, such as might be caused by tube aging or filament voltage variations, are compensated for. The output circuit may be a constant-impedance resistive network which provides the required adjustable output level range.

*Delay line*

Actual timing of the leading and trailing edges of all signal waveforms may be accomplished by the pulses fed to the control gates 31 through 39 shown in FIG. 2, from the delay line 21. The delay line 21 may comprise a large number of parallel-connected inductors and capacitors, with numbered connection taps. Each section of the delay line may delay the passage of the applied pulse by an increment of 1.0 microsecond in the sections listed on the table of this paragraph and by an increment of 0.33 microsecond in all other sections. As shown, the delay line presents output taps at minus 4.44, minus 1.59, zero, plus 2.30, plus 4.76, and plus 9.52 microseconds.

| Identification | Terminal Location | Function | Range of Taps |
|---|---|---|---|
| a | Board 8 | Delay line input | 1 |
| b | Board 4 | Start of blanking pulses | 22–26 |
| c | Board 4 | Start of H drive pulses | 22–26 |
| d | Board 4 | Start of V drive pulses | 22–26 |
| e | Board 4 | End of H drive pulses | 54–59 |
| f | Board 4 | End of V drive pulses | 54–59 |
| g | Board 4 | Start of sync pulses | 19 |
| h | Board 4 | End of equalizing pulses | 40–44 |
| i | Board 4 | End of H blanking pulses | 71–80 |
| j | Board 4 | End of H sync pulses | 54–59 |
| k | Board 9 | End of V sync pulses | 6-11 |

*Pulse sharpener*

The pulses in the train from the delay line 21 to the vertical sync trailing edge gate shown on line *k* of FIG. 2 must be sharpened to a maximum width of 1.0 microsecond. This is done by emitter follower pulse shapener 100 shown in FIG. 2 by a circuit similar to the circuit of stage 102 in the crystal oscillator. The emitter follower is stage 9Q1 which may be a common-emitter connected PNP transistor in contradistinction to the NPN transistor of the crystal oscillator since no phase inversion is required. The positive delay line pulse incident on the base of stage of stage 9Q1 is coupled through capacitor 9C2 and produces a damped half-cycle of sine wave, not more than 1.0 microsecond wide at the emitter of stage 9Q1. Resistor 9R1 provides proper bias stabilization, and capacitor 9C1 bypasses the A.-C. voltage across resistor 9R1.

While a specific embodiment of the invention has been shown and described, it should be recognized that the invention should not be limited thereto. It is accordingly intended in the appended claims to claim all such variations as fall within the true spirit of the invention.

What is claimed is:

1. A television synchronizing generator comprising an oscillator operating at twice horizontal line rate; means for deriving a signal synchronized therewith at horizontal line rate; a count of three counter input coupled to said oscillator and an eight stage binary counter connected to the output of the first counter, said eight stage counter being adapted by means of preset connections from the final stage to the first, fifth, and seventh stages to count to 175; at least four "and" gates input coupled to said eight stage counter and to one another for operation as follows: said first "and" gate responding to the coincidence of one polarity states at stage 2, stage 3, and an output from said second "and" gate; said second "and" gate responding in said one polarity to the coincidence of said one polarity states at stages 4, 6 and 8; said third "and" gate responding to the coincidence of the other polarity states of stages 2, 4, 5, 6, 7 and 8, said fourth "and" gate responding to the coincidence of the other polarity states of stages 3, 4, 5, 6, 7 and 8; four "or" gates input coupled to said "and" gates, to one another and to said horizontal line rate means for operation as follows: said first "or" gate responding to a signal from said first "and" gate or the output of said fourth "or" gate; said second "or" gate responding to the presence of a signal from said second "and" gate or the output of said fourth "or" gate, said third "or" gate responding to the presence of said signal at horizontal line rate or the output of said fourth "or" gate; and said fourth "or" gate responding to the presence of a signal at the output of the third or fourth "and" gate; means for controlling blanking responding to said second and third "or" gate outputs, means for controlling vertical drive responding to the outputs of said first and fourth "or" gate outputs; and means for controlling synchronizing the responding to said third "or," said third "and," said fourth "or" and said fourth "and" gate outputs.

2. The combination set forth in claim 1 having in addition thereto a tapped delay line to which said oscillator is coupled for deriving pulses at selected times within the oscillation interval, and circuit means for timing the precise actuation of said blanking, vertical drive and synchronizing pulse controlling means from signals derived from said delay line.

3. The combination set forth in claim 2 having in addition thereto means for controlling horizontal drive responding to the presence of said signal at horizontal line rate and precisely timed by a signal derived from said tapped delay line.

4. The combination set forth in claim 1 wherein the on condition of said synchroniing pulse control means is responsive to an output from said third "or" gate and the off condition is responsive to an output from either said third "and," said fourth "and," or said fourth "or" gates.

5. The combination set forth in claim 1 wherein the on condition blanking control means is responsive to an output from said third "or" gate and said off condition is responsive to an output from said second "or" gate.

6. The combination set forth in claim 1 wherein the on condition of said vertical drive is responsive to an output from said fourth "or" gate and said off condition is responsive to an output from said first "or" gate.

7. The combination set forth in claim 1 wherein the on condition of said blanking control means is responsive to an output from said third "or" gate and said off condition is responsive to an output from said second "or" gate; the on condition of said vertical drive is responsive to an output from said fourth "or" gate and said off condition is responsive to an output from said first "or" gate; and the on condition of said synchronizing pulse control means is responsive to an output from said third "or" gate and the off condition is responsive to an output from either said third "and," said fourth "and," or said fourth "or" gates.

8. The combination set forth in claim 1 wherein the stages of said 8 stage counter are each provided with a pair of active devices, one device of each pair providing an output coupled to the succeeding stage, and the non-output member of each pair providing the input for coupling to said respective "and" gates.

9. The combination set forth in claim 8 wherein the active devices are semiconductors.

10. The combination set forth in claim 9 wherein said first and second "and" gates utilize diode logic and sense the non-conductive states of the active devices to which they are connected, said first and second "and" gates being additionally provided with succeeding power amplifiers prior to connection to said succeeding respective "or" gates.

11. The combination set forth in claim 10 wherein said first and said second "or" gates utilize active semiconductor devices.

12. The combination set forth in claim 1 having a fifth "and" gate responding to the coincidence of the other polarity states of stages 4, 5, 6, 7 and 8 to provide a pulse of said other polarity to both said third and fourth "and" gates.

13. The combination set forth in claim 12 wherein said third, fourth, and fifth "and" gates utilize active semiconductor devices, said third and fourth "and" gates responding in said one polarity to the coincidence of input signals of said other polarity.

14. The combination set forth in claim 13 wherein the on condition of said synchronizing pulse control means is responsive to an output from said third "or" gate and the off condition is responsive to an output from either said third "and," said fourth "and" or an inversion of said fourth "or" gates.

15. The combination set forth in claim 1 wherein said counters, said "and" and "or" gates are interconnected by direct current paths.

16. The combination set forth in claim 1 wherein said count of three counter comprises two stages, the first stage comprising a first and a second active element interconnected for bistable operation, the second stage comprising similarly interconnected third and fourth active elements, a source of unidirectional input pulses coupled to said third active element and to a first and second diode gate, said first diode gate being poled to pass input pulses to both said first and second active elements, said first gate being closed when said third active element is non-conductive, and vice versa; said second diode gate being poled to pass input pulses to said fourth active element, said second diode gate being closed when said second active element is non-conductive, and vice versa, and means for deriving an output signal coupled to said fourth active element.

17. A television synchronizing generator comprising an oscillator operating at twice horizontal line rate, a count of three counter input coupled to said oscillator and an eight stage binary counter connected to the output of the first counter, said eight stage counter being preset by its own output pulses to count to 175, logic coupled to successive stages of said eight stage counter for controlling the operation of blanking, vertical drive and synchronizing pulses timed to occur at specified moments in accordance with the NTSC standards, said logic relating the eighteenth count of the vertical interval of the synchronizing pulse controlling signal to correspond to the output presetting pulse of said eight stage counter.

18. A television synchronizing generator comprising an oscillator operating at twice horizontal line rate, a count of three counter input coupled to said oscillator and an eight stage binary counter connected to the output of the first counter, said eight stage counter being preset by its own output pulses to count to 175, and logic coupled to successive stages of said eight stage counter for controlling the operation of blanking, vertical drive and synchronizing pulses timed to occur at specified moments in accordance with the NTSC standards.

19. In a system for producing a composite interlace-type synchronizing signal including horizontal, vertical and equalizing pulses, an oscillator operative at the repetition rate of the vertical and equalizing pulses, a frequency divider chain connected to said oscillator and including one stage operated at a rate equal to the reciprocal of the duration of each train of vertical pulses and a final stage operated at the repetition rate of the trains of vertical and equalizing pulses, a coincidence circuit having a plurality of inputs connected to said one stage, to said final stage and to at least one other stage intermediate said one stage and said final stage, and means controlled by the output of said coincidence circuit for generating said composite synchronizing signal.

20. In a system for producing a composite interlace-type synchronizing signed including horizontal pulses, trains of vertical pulses, and trains of equalizing pulses preceding and following each train of vertical pulses, each of said trains having the same duration, an oscillator operative at the repetition rate of the vertical and equalizing pulses, a frequency divider chain connected to said oscillator and including a first stage operated at a certain rate equal to the reciprocal of said train duration, a second stage operated at a rate equal to said certain rate divided by a factor at least equal to three and not greater than four, and a final stage operated at the repetition rate of said trains, a coincidence circuit having a plurality of inputs connected to said first, second and final stages, and means controlled by the output of said coincidence circuit for generating said composite synchronizing signal.

21. In a system for producing a composite interlace-type synchronizing signal including horizontal, vertical and equalizing pulses, an oscillator operative at the repetition rate of the vertical and equalizing pulses, a frequency divider chain connected to said oscillator and including a first stage operated at a certain rate equal to the reciprocal of the duration of each train of vertical pulses, a second stage operated at one-half of said certain rate and a final stage operated at the repetition rate of the trains of vertical and equalizing pulses, and a coincidence circuit having a plurality of inputs connected to said first, second and final stages to develop a control signal of one value during the vertical pulse intervals and of another value during the remainder of the time.

22. In a synchronizing pulse generator, means for producing a low frequency control signal, comprising: a frequency divider responsive to a high frequency input signal and including a plurality of cascade-connected multivibrator stages operated at various submultiples of said high frequency, each of said stages being arranged to produce an output signal cyclically shifted and between one value and another, a control device including input and output electrodes, means including a series output impedance for connecting a direct current source in circuit with said output electrode, and a plurality of separate coupling means for applying a plurality of said output signals to said input electrode, said control device being rendered conductive to conduct a certain current through said output impedance when one or more of said output signals is of one value and being rendered non-conductive only when all of said signals are of said another value.

23. In a synchronizing pulse generator, means for producing a low frequency control signal, comprising: a frequency divider responsive to a high frequency input signal and including a plurality of cascade-connected multivibrator stages operated at various submultiples of said high frequency, each of said stages including a pair of transistors, means for connecting all of said stages to a common direct current supply, said transistors when conducting having a relatively low impedance to act essentially as switches, whereby an output signal is produced from each stage cyclically shifted between one value and another value respectively equal to the potentials of the terminals of the common direct current supply, a control device including input and output electrodes, means including a series output impedance for connecting a direct current source in circuit with said output electrode, and a plurality of separate coupling means for applying a plurality of said output signals to said input electrode, said control device being rendered conductive to conduct a certain amount through said output impedance when one or more of said output signals is of one value and being rendered non-conductive only when all of said signals are of said another value.

24. In a system for producing a composite synchronizing signal including horizontal sync pulses, vertical sync pulses and equalizing pulses, and a composite blanking signal including horizontal and vertical blanking pulses, a high frequency oscillator, means including a frequency divider chain controlled by said oscillator for developing a first low frequency control signal which is on during the vertical pulse interval and off the remainder of the time, a second low frequency control signal which is on during the equalizing pulse intervals and off the remainder of the time and a third low frequency control signal which is on for a certain time interval following completion of the equalizing pulse intervals, means controlled by said first and second control signals and by signals from said high frequency oscillator for generating the composite sync signal, a coincidence circuit responsive to said first, second and third control signals to develop a fourth control signal which is on when any one of said first, second and third control signals is on and which is off the remainder of the time, and a composite blanking signal generator responsive to said fourth control signal.

25. In a system for producing a composite synchronizing signal including horizontal sync pulses, vertical sync pulses and equalizing pulses, and a composite blanking signal including horizontal and vertical blanking pulses, a high frequency oscillator, means including a frequency divider chain controlled by said oscillator for developing a first low frequency control signal which is on during the vertical pulse interval and off the remainder of the time, a second low frequency control signal which is on during the equalizing pulse intervals and off the remainder of the time and a third low frequency control signal which is on for a certain time interval following completion of the equalizing pulse intervals, means controlled by said first and second control signals and by signals from said high frequency oscillator for generating the composite sync signal, a coincidence circuit responsive to said first, second and third control signal to develop a fourth control signal which is on when any one of said first, second and third control signals is on and which is off the remainder of the time, a divide-by-two multivibrator responsive to signals derived from high frequency oscillator, and a composite blanking signal generator responsive to the output of said divide-by-two multivibrator and to said fourth control signal.

26. In a system for producing a composite synchronizing signal including horizontal sync pulses, vertical sync pulses and equalizing pulses, and a composite blanking signal which is on when any one of said first, second and a high frequency oscillator, means including a frequency divider chain controlled by said oscillator for developing a first low frequency control signal which is on during the vertical pulse interval in the equalizing and vertical pulse intervals and off the remainder of the time, a second low frequency control signal which is on during the equalizing pulse intervals and off the remainder of the time and a third low frequency control signal which is on for a certain time interval following completion of the equalizing pulse intervals, means controlled by said first and second control signals and by signals from said high frequency oscillator for generating the composite sync signal, a coincidence circuit responsive to said first, second and third control signals to develop a fourth control signal which is on when any one of said first, second and third control signals is on and which is off the remainder of the time, and a composite blanking signal generator responsive to said fourth control signal.

References Cited by the Examiner

UNITED STATES PATENTS

| | | | |
|---|---|---|---|
| 2,766,379 | 10/1956 | Pugsley | 250—27 |
| 2,799,727 | 7/1957 | Segerstrom | 178—69.5 |
| 2,892,953 | 6/1959 | McVey | 307—88.5 |
| 2,926,242 | 2/1960 | Feyzeau | 328—187 |
| 2,939,085 | 5/1960 | Foster et al. | 328—187 |
| 3,006,995 | 10/1961 | Fathauer | 178—69.5 X |

DAVID G. REDINBAUGH, *Primary Examiner.*

G. WIRTHY, *Examiner.*

J. W. HUCKERT, R. MURRAW, *Assistant Examiners.*

UNITED STATES PATENT OFFICE

CERTIFICATE OF CORRECTION

Patent No. 3,281,532 October 25, 1966

Laurance M. Leeds

It is hereby certified that error appears in the above numbered patent requiring correction and that the said Letters Patent should read as corrected below.

Column 16, line 31, strike out "the"; column 20, line 11, for "which is on when any one of said first, second and" read -- including horizontal and vertical blanking pulses, --.

Signed and sealed this 5th day of September 1967.

(SEAL)
Attest:

ERNEST W. SWIDER
Attesting Officer

EDWARD J. BRENNER
Commissioner of Patents